Patented July 12, 1932

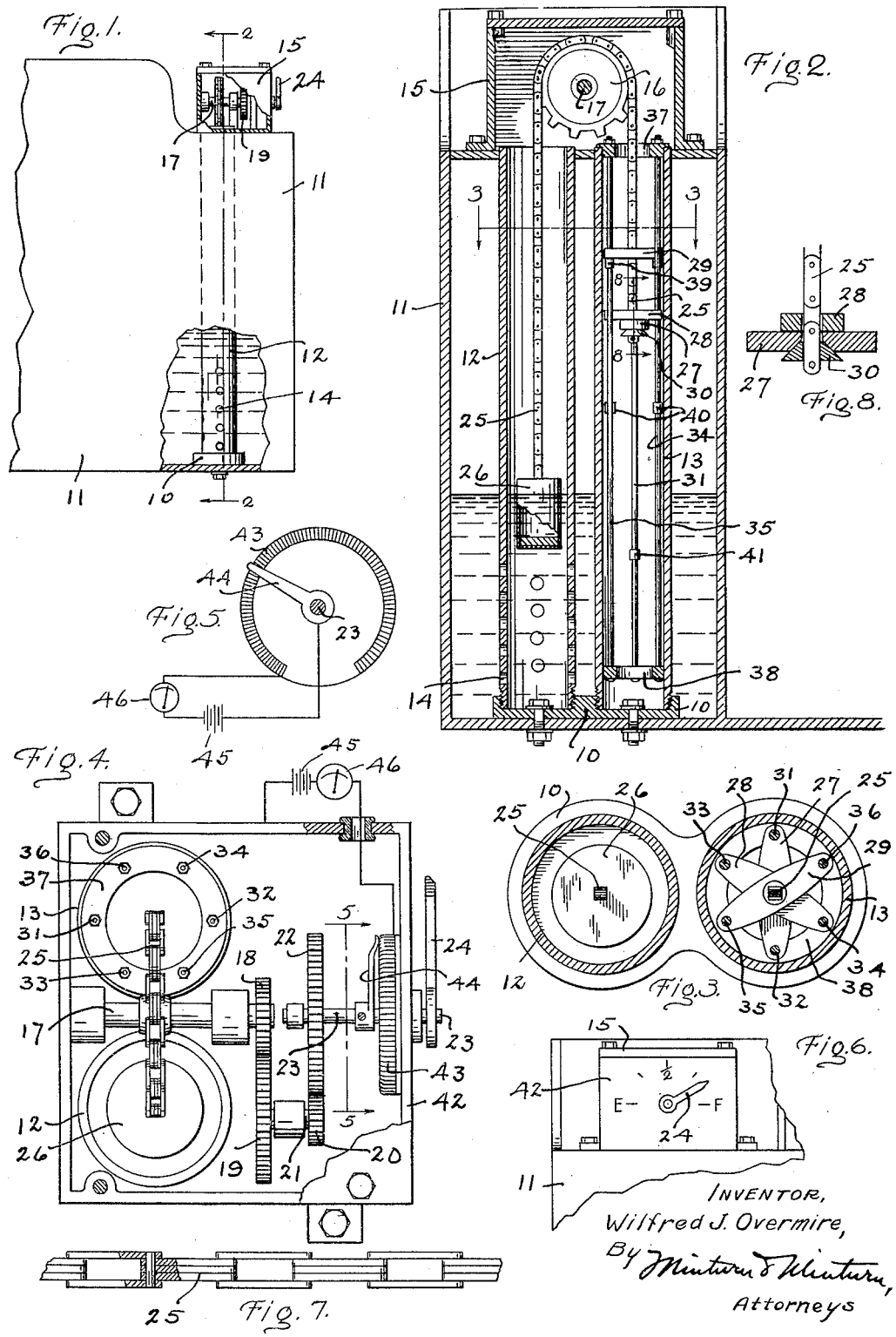

1,866,902

UNITED STATES PATENT OFFICE

WILFRED J. OVERMIRE, OF INDIANAPOLIS, INDIANA

LOCOMOTIVE TENDER TANK GAUGE

Application filed March 8, 1930. Serial No. 434,250.

This invention relates to the art of tank gauges and particularly to means for visibly indicating the quantity of water in a locomotive tender tank. Heretofore, it has been necessary for the fireman to crawl back over th coal to the hatch opening into the tank, drop a pole or stick down into the water, and pull it out and observe how far up the stick was wet to determine how much water remained in the tank and how soon a stop would have to be made to take on more water. Water glasses and try cocks have been employed, but being subject to freezing and breakage they were unsatisfactory. Moreover the surge within the tank affected such indicators so as to prevent any close observation of the actual amount of water.

It is the primary purpose of my invention to provide a gauge that may give visible indications from the cab of the locomotive and that may be depended upon under all service conditions to indicate with close accuracy the exact amount of water in the tank even down to the last few inches at the bottom.

Other objects reside in the provision of a simple mechanism having a minimum number of parts that require practically no attention as to upkeep; in the provision of means permitting the water quantities to be read from an indicator removed at a distance from the tank as well as from means above the tank; and in the structure provided for compensating for changing lengths of a chain or cable following a float in the water.

These and other objects will become apparent in the following description of the invention as illustrated by the accompanying drawing, in which Fig. 1, is a fragmentary side elevation of the forward end of a tank to which my invention is applied.

Fig. 2, a vertical transverse section on the line 2—2 in Fig. 1;

Fig. 3, a horizontal transverse section on the line 3—3 in Fig. 2;

Fig. 4, a top plan view of the gauge with the cover removed;

Fig. 5, a diagram of the electrical indicator;

Fig. 6, a detail in front elevation of the mechanical indicator;

Fig. 7, a detail in top plan view of the operating chain; and

Fig. 8, a detail in vertical section on the line 8—8 in Fig. 2.

Like characters of reference indicate like parts throughout the several views in the drawing.

I attach a fitting 10 to the inside bottom of the tank 11 and screw-threadedly secure thereto the stand pipes 12 and 13 which have their upper ends supported through corresponding holes cut through the top of the tank. The pipe 12 is provided with a plurality of perforations 14 at its lower end so that water within the tank 11 may enter thereby and flow into the pipe 12 and reach the same level within as exists in the tank. By reason of the perforations being relatively small, splashing and surging of the water in the tank will not materially cause the level of the water in the pipe to differ from the true level of the water in the tank 11.

The other pipe 13 has a water tight joint with the fitting 10 and all water is excluded therefrom. A box 15 is mounted over the upper ends of the pipes 12 and 13 and carries a sprocket wheel 16 centrally therebetween and in the plane of the axes of the two pipes. The sprocket wheel 16 is fixed on the shaft 17 which is revolvably carried within the box 15. A spur gear 18 fixed on the shaft 17 is in constant mesh with a larger gear 19, and in turn the small spur gear 20 fixed on the shaft 21 carrying the gear 19 meshes with the larger gear 22 which is fixed on the indicator shaft 23 which extends to without the box 15 and carries the indicator hand 24 on the outer end.

A suitable chain 25, here shown as built up from plates, is placed over the sprocket wheel 16 to have its ends drop down from the wheel into the pipes 12 and 13. On the end of the chain in the pipe 12 is secured a float 26 preferably loaded at the bottom to cause it to ride with a considerable portion below the surface of the water so as to insure stability of the float.

On the end of the chain in the pipe 13 are loosely strung a plurality of weights, here shown as three in the number and consisting of the weights 27, 28 and 29. A conical stop 30 is secured on the end of the chain 25 to prevent the weights from slipping off the chain. These weights 27, 28 and 29 have holes vertically through their outer ends and are radially positioned around the chain 25 to have the rods 31 and 32 pass through the holes in the weight 27; rods 33 and 34 through the holes in the weight 28; and rods 35 and 36 through the holes in the weight 29. All of these rods are suspended within the pipe 13 from the top spacing ring 37 resting on the pipe and have their lower ends secured in the ring 38 so as to maintain the rods equally spaced one from the other in vertical parallel relation.

The total length of the chain 25 is such that when the tank 11 is empty and the float 26 is at the bottom of the pipe 12, the other end of the chain is at the top of the pipe 13 and is there holding all three weights, one resting upon the other. The combined weight of the weights 27, 28 and 29 is provided to approach that of the length of the chain 25 from the sprocket wheel 16 to the float 26 when the tank is empty so that it is practically the weight of the float 26 only that pulls the weights to the top of the pipe 13.

Now as the water level in the tank may be raised, the float 26 will rise and the weights 27, 28 and 29 will pull the chain 25 around over the sprocket wheel 16 and down into the pipe 13. Since the weight of the increasing length of the chain then being presented within the pipe 13 is added to the weights 27, 28 and 29, the float 26 would normally tend to be pulled upward to ride higher in the water if not even lifted out, and to prevent any material change in the submerged part of the float 26, I provide stops 39 on the rods 35 and 36 at a short distance down from the ring 37 so as to stop and there hold the weight 29 and remove it from the downward pull on the chain 25 thereby causing the resultant combined weight of the chain and the two weights in the pipe 13 to return to the normal weight just sufficient to keep that part of the chain in pipe 12 pulled up taughtly from the float 26 and over the sprocket wheel 16.

Further increase in water level brings the float 26 successively higher to then drop off the weight 28 on the stops 40 on the rods 33 and 34 and later the weight 27 on the stops 41 on the rods 31 and 32 from which point the weight of the chain alone is sufficient to maintain the proper balance over the wheel 16.

As the water level lowers, the reverse action takes place, in that, as the chain increases in length in the pipe 12, the weight 27 is first picked up by the stop 30 and then carried up to contact and lift the next above weight 28 which in turn lifts and carries the weight 29, thereby restoring the balance at relatively close intervals.

As the chain 25 travels over the sprocket wheel 16, the wheel is accordingly rotated to in turn, through the reduction gears above described, rotate the indicator hand 24 through a half circle of travel while the float 26 traverses the length of the pipe 12. The face of the box 15 is provided with a dial 42 calibrated in gallons, cubic feet, or depth in inches as may be desired so as to give a visible indication of the quantity of water in the tank.

Where the pipes 12 and 13 may be located in the tank 11 so that the hand 24 may not be readily observed, I provide an indicating device comprising essentially a rheostat having a resistance coil 43 circularly disposed about the shaft 23 within the box 15 and a contact arm 44, a source of electricity here indicated as a battery 45, and a current flow indicator 46. As the shaft 23 revolves, the arm 44 is revolved accordingly over the coil 43 to vary the resistance in the circuit and the indicator 46 will show readings according to the change in resistance. The dial of the indicator can of course be calibrated to have such readings indicate the quantity of water in the tank in the desired units.

While I have here described and shown my invention in the one form as now best known to me, it is obvious that structural changes may be made without departing from the spirit of the invention, and I, therefore, do not desire to be limited to that precise form, nor any more than may be required by the following claims.

I claim:

1. In a tank gauge, a sprocket wheel, a chain over the wheel, an indicating means operable upon rotation of the wheel, a float on one end of the chain, a plurality of weights freely strung at their middles on the other end of the chain, a pair of guide rods one on each side of the chain through each of said weights, stops selectively spaced along said rods, and a stop on the end of the chain under said weights.

2. In a tank gauge, a sprocket wheel, a chain over the wheel, an indicating means operable upon rotation of the wheel, a float on one end of the chain, a plurality of weights freely strung at their middles on the other end of the chain, a pair of guide rods one on each side of the chain through each of said weights, stops selectively spaced along said rods, and a stop on the end of the chain under said weights, a water tight pipe surrounding said weights and guides, and means maintaining said guides in a spaced relation within the pipe.

3. In a tank gauge, a sprocket wheel, a chain over the wheel, an indicating means operable upon rotation of the wheel, a float on one end of the chain, a plurality of weights freely strung at their middles on the other end of the chain, a pair of guide rods one on each side of the chain through each of said weights, stops selectively spaced along said rods, and a stop on the end of the chain under said weights, a water tight pipe surrounding said weights and guides, means maintaining said guides in a spaced relation within the pipe, and a float pipe having an opening at the bottom in which pipe said float may travel.

In testimony whereof I affix my signature.

WILFRED J. OVERMIRE.